United States Patent [19]

Wavre

[11] 4,298,782

[45] Nov. 3, 1981

[54] METHOD AND APPARATUS FOR STRAIGHTENING THE WIRE ELECTRODE OF AN ELECTRICAL DISCHARGE MACHINING APPARATUS

[75] Inventor: Alain Wavre, Geneva, Switzerland

[73] Assignee: Ateliers des Charmilles, S.A., Geneva, Switzerland

[21] Appl. No.: 40,673

[22] Filed: May 21, 1979

[30] Foreign Application Priority Data

May 29, 1978 [CH] Switzerland .................. 5827/78

[51] Int. Cl.³ .............................................. B23P 1/02
[52] U.S. Cl. ............................. 219/69 M; 219/69 W
[58] Field of Search ........................ 219/69 W, 69 M

[56] References Cited

U.S. PATENT DOCUMENTS

| 4,081,652 | 3/1978 | Jänicke et al. | 219/69 W |
| 4,104,502 | 8/1978 | Ullmann et al. | 219/69 W |
| 4,205,213 | 5/1980 | Inoue | 219/69 W |

Primary Examiner—C. C. Shaw
Attorney, Agent, or Firm—Hauke and Patalidis

[57] ABSTRACT

An EDM method and apparatus for cutting a workpiece by a wire electrode in the form of a metallic tape or wire, in which the traction exerted on the wire electrode by the mechanism feeding the wire electrode in the machining zone between the wire electrode and the workpiece is modified momentarily, and the variation of machining rate caused by the momentary modification of the force of traction exerted on the wire electrode is detected. The direction in which the machining rate is changed provides an indication of the effect, on the wire electrode, of the transverse forces which deflect the wire in the machining zone, relative to its longitudinal axis. The direction in which the machining rate varies is used to select the direction in which a predetermined machining parameter affecting the transverse forces applied on the wire electrode is changed, such as to maintain the wire electrode properly aligned along its longitudinal axis.

31 Claims, 5 Drawing Figures

METHOD AND APPARATUS FOR STRAIGHTENING THE WIRE ELECTRODE OF AN ELECTRICAL DISCHARGE MACHINING APPARATUS

BACKGROUND OF THE INVENTION

The present invention relates to an EDM method and apparatus for cutting a workpiece by way of an electrode tool in the form of an electrically conductive wire, ribbon or tape, all generally referred to as wire electrodes, the wire electrode being displaced relative to the workpiece along a path corresponding generally to the longitudinal axis of the wire, while being simultaneously fed along a cutting path at an angle to such longitudinal axis, so as to effectuate a cut in the electrode workpiece as a result of voltage pulses applied across the electrodes triggering electrical current discharges to pass through the machining zone formed between the two electrodes. The wire electrode is fed and stretched between a pair of support and guide members as a result of a predetermined force of traction being exerted on the wire electrode in the general direction of its longitudinal axis.

In the course of cutting the electrode workpiece, the wire electrode is subjected to forces which are applied transversely. Some of those forces tend to repel the wire electrode from the workpiece, as, for example, the reaction forces exerted on the wire electrode by the miniature explosions occurring in the machining fluid when each electrical discharge passes through the fluid in the machining zone, while other forces cause the wire electrode to be attracted toward the workpiece, as, for example, electrostatic and electromagnetic forces resulting respectively from the voltage across the electrodes and the machining current flow. When the resultant force of all the component forces of repulsion and attraction is applied in a direction other than the longitudinal axis of the wire electrode, the wire is deflected transversely relative to its longitudinal axis of motion, as defined by its support and guide members, until an equilibrium is achieved under the influence of an additional component force directed in a transverse direction resulting, for example, from a variation of the intensity of the traction force applied to the wire. Unwanted deflections of the wire result in machining errors, more particularly when the cutting path through the workpiece is along a curve of small radius.

Methods are known which permit to decrease such machining errors, and which consist either in acting upon the forces of repulsion acting on the wire electrode (U.S. Pat. No. 4,081,652, issued Mar. 28, 1978, and assigned to the same assignee as the present application), or on the forces of traction (U.S. Pat. No. 4,104,502, issued Aug. 1, 1978, and assigned to A. G. fur industrielle Elektronik). The first of such methods presents, however, the inconvenience of slowing down the machining speed, and the second does not permit to adjust the amplitude of the correcting factors to be applied upon the wire for maintaining the wire correctly aligned with its support and guide members.

Another method, disclosed in application Ser. No. 843,431, filed Oct. 19, 1977, now abandoned and assigned to the same assignee as the present application, consists in correcting the preprogrammed cutting path in the workpiece by taking into consideration the permanent deviation of the wire. However, the continuous occurrence of the deviation of the wire results in a machining error in the course of cutting a path forming a sharp angle, as a result of the curvilinear shape taken by the wire in the machining zone.

SUMMARY

The method of the present invention permits to remedy the shortcomings of the prior art methods by permitting to straighten the wire electrode in the course of machining the workpiece with the result that the cut can be effected at an optimum speed. The present invention is characterized by providing a momentary variation of the force of traction exerted on the wire electrode, measuring the influence of such a variation upon a characteristic magnitude representing the machining efficiency, and adjusting, in response thereto, at least one of the machining parameters causing a transverse force to be applied upon the wire electrode, such as to reduce to a minimum value the influence of such a variation on the characteristic magnitude and such as to provide a correct alignment of the wire with its support and guide means.

The advantage of the method of the present invention and of the apparatus for practicing the method is to enable detecting, in the course of a machining pass, the appearance of the deviation of the wire and the direction, or algebraic sign, of the deviation, such as to effectuate a correction as a function of the forces acting on the wire until an accurate alignment of the wire with its support and guide means is achieved, the alignment of the wire being obtained in such manner that a variation of the force of traction exerted on the wire has practically no influence upon the machining conditions. The result is that machining is effected both with precision and with speed.

BRIEF DESCRIPTION OF THE DRAWING

The many objects and advantages of the present invention will become apparent to those skilled in the art when the following description of the best mode contemplated for practicing the invention is read in conjunction with the accompanying drawing given for illustrative purpose only and in which.

DETAILED DESCRIPTION OF THE PREFERRED EMBODIMENT

Figures 1, 2, 3:
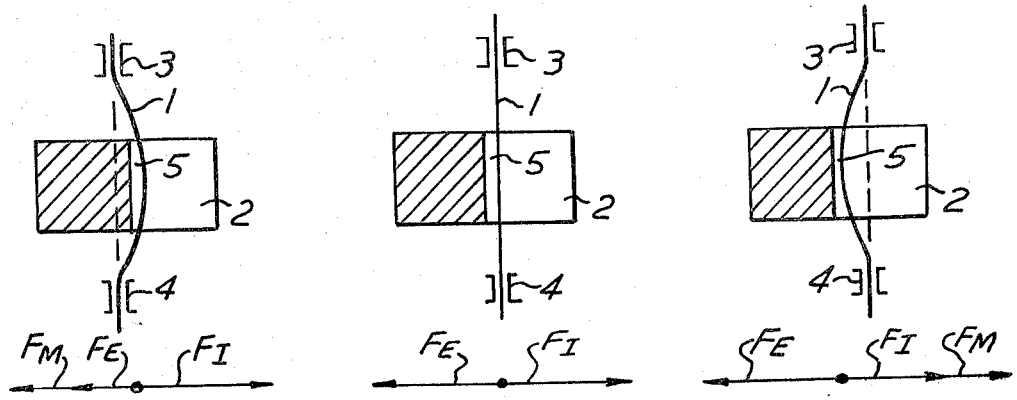
FIGS. 1 through 3 schematically illustrate three examples of deviation of a wire electrode relative to its support and guide members, and corresponding diagrams of the composition of the forces acting transversely on the wire electrode.

Referring now to FIG. 1, a wire electrode 1 is schematically illustrated being displaced relative to an electrode workpiece 2 and being supported by a pair of support and guide members 3 and 4 between which the wire electrode 1 is stretched as a result of applying to the wire a predetermined force of traction. When electrical discharges are established across a machining zone 5 between the wire 1 and the workpiece 2, the wire is urged transversely under the action of the resultant of diverse forces applied to the wire. The diverse forces are principally the forces due to the explosions occurring within the machining fluid filling the gap between the wire and the workpiece in the machining zone 5, at the occurrence of each electrical discharge, which tend to pull the wire 1 away from the workpiece 2, and to the forces resulting from the electrastatic effect of the voltage between the electrodes, which act in a direction attracting the wire 1 toward the workpiece 2. A diagram of component force vectors is schematically illustrated at the bottom of FIG. 1 respectively by the vector $F_I$ representing the forces of repulsion and $F_E$ representing the forces of attraction. When the forces of repulsion represented by vector $F_I$ are greater than the forces of attraction represented by vector $F_E$, the wire 1, during machining of the workpiece, is progressively displaced laterally out of shape until a component of mechanical force, represented by force vector $F_M$, while is due to the transverse component of the force of traction exerted on the wire is algebraically added to the vector $F_E$ to balance the forces represented by vector $F_I$. The wire 1 therefore takes the position, relative to the workpiece 2, schematically illustrated at FIG. 1, and is no longer aligned with the wire support and guide members 3 and 4, which causes a machining on the machining zone 5 to lag behind relative to its programmed position and between the programmed cutting pass and the actual cutting pass.

However, if the force vector $F_I$ is equal to the force vector $F_E$, the mechanical component vector $F_M$ disappears and the wire 1 becomes aligned with the support and guide members 3 and 4 as illustrated at FIG. 2, thus eliminating any machining error. Another possibility is that schematically illustrated at FIG. 3 which is the condition resulting from the forces $F_E$ being greater than the forces $F_I$. Under those conditions, the force vector $F_M$ adds up to the force vector $F_I$ to balance the force vector $F_E$, and the machining zone 5 is located ahead of the position determined by the wire support and guide members 3 and 4. Such a condition also results in a machining error.

Varying momentarily the traction exerted on the wire 1, for example decreasing the force of traction, results in a momentary increase of the machining gap 5, if the wire 1 is in the position illustrated at FIG. 1. Such an increase of the machining gap causes a decrease of the rate of short circuited electrical discharges and an increase of the time delay for triggering the electrical discharges. By contrast, if the wire 1, prior to a momentary decrease of the force of traction, is in the position shown at FIG. 3, a decrease of the force of traction causes a decrease of the machining gap 5, an increase of the short circuit discharge rate and a decrease of the time delay for triggering the electrical discharges.

It can thus be seen that the direction in which a characteristic magnitude of the machining rate varies, such as the short circuit rate or the average time delay for triggering the discharges, resulting from a variation of the force of traction applied to the electrode wire, provides an indication of the direction of motion of the wire relative to the wire support and guide members. Consequently, the forces $F_E$ and/or the forces $F_I$ can be varied in response to a variation of the machining rate, such as to straighten the wire 1 until it is aligned in the position illustrated at FIG. 2. When the wire 1 is in the straight position illustrated at FIG. 2, a variation of the force of traction applied to the wire has no longer any effect on the machining rate.

The force $F_E$ can be adjusted by controlling the level and/or the duration of the voltage applied between the wire 1 and the workpiece 2, and the forces $F_I$ can be adjusted by action upon the machining discharge energy and/or the frequency of the electrical discharges. It is preferable to act only upon the forces $F_E$, such as to maintain the machining speed at a maximum rate. It is readily apparent that the decrease of the force of traction applied upon the wire 1 can be replaced by an increase of the force of traction. In the latter case, the variation of the characteristic magnitude corresponding to the machining rate changes its direction while passing from the position illustrated at FIG. 1 or FIG. 3 to the position illustrated at FIG. 3 or FIG. 1, respectively.

Figure 4:
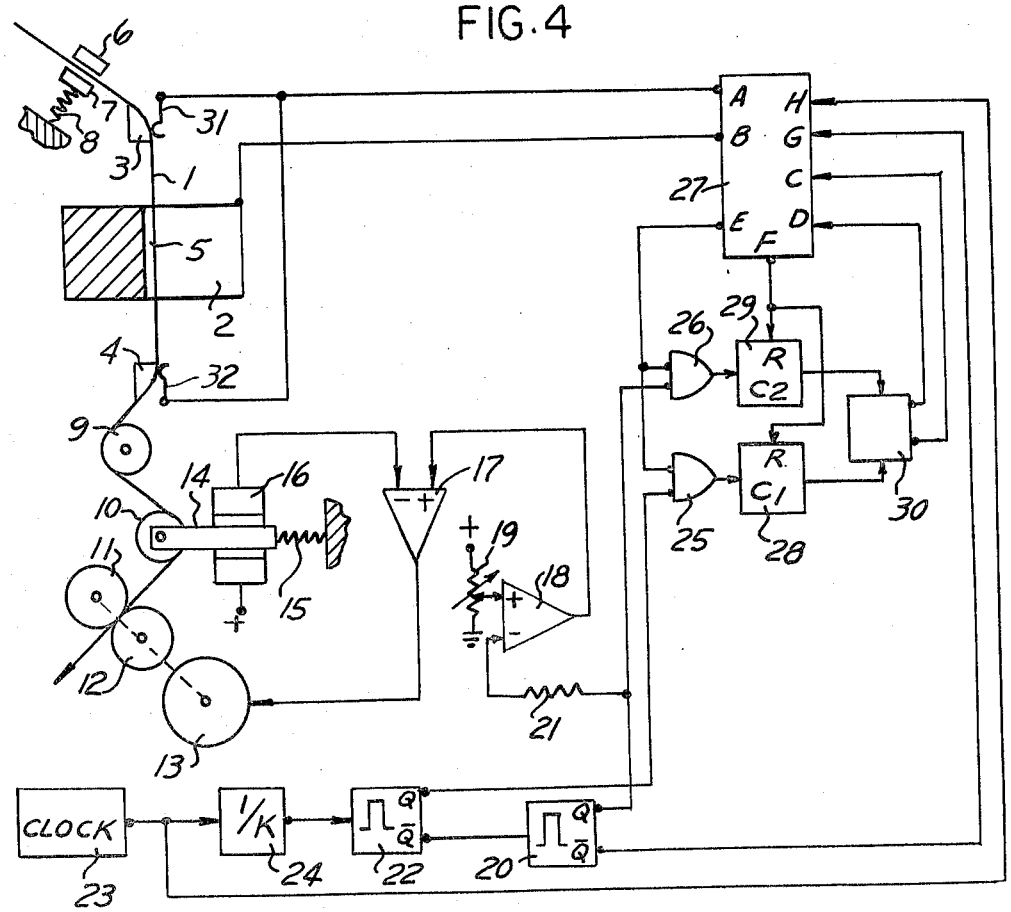
FIG. 4 illustrates a circuit schematic of an arrangement for controlling and adjusting the deviation of a wire electrode.

FIG. 4 is a schematic illustration of a circuit diagram permitting measurement of the deviation of the wire 1 and adjustment according to the method of the invention. Prior to being fed through the machining zone 5, the electrode wire 1 passes between a stationary member 6 and a movable member 7 urged by a spring 8 towards the stationary member 6, such that the forward motion of the wire is restrained as a result of being frictionally held between the two members. After passage through the machining zone 5, the wire 1 wraps around part of the periphery of each of a pair of pulleys 9 and 10, and is pulled by passing between a pair of pinch rollers 11 and 12 driven by a motor 13.

The force of traction exerted on the wire 1 by the motor 13 driving the pinch rollers 11 and 12 is measured by means of a member such as a rod 14 having one end rotably supporting the pulley 10, the rod 14 being pulled in one direction such as to exert a pull on the wire 1 by means of a return spring 15. The displacement of the rod 14 is detected by a position transducer 16 which provides a signal which is applied to one of the inputs of an op-amp differential amplifier or comparator 17 having another input to which is applied a variable reference signal obtained at the output of a second op-amp differential amplifier or comparator 18. The differential amplifier or comparator 18 has two inputs, one connected to the slider of a potentiometer 19 and the other to the output Q of a monostable multivibrator 20 through a resistor 21.

The monostable multivibrator 20 is controlled by the signal at the output $\overline{Q}$ of a monostable multivibrator 22 whose inputs receive timing pulses from an oscillator or clock 23 through a frequency divider 24. The outputs Q of the monostable multivibrators 22 and 20, respectively, are connected to one of the inputs of a pair of AND gates 25 and 26, the other inputs of the AND gates being connected each to an output E of a circuit 27. The circuit 27 comprises means for applying machining pulses between the electrodes, for adjusting at least one of the electrical parameters of the pulses and for measuring the material removal rate or efficiency. An example of an appropriate arrangement of the circuit 27 is disclosed in detail at FIG. 5.

Referring back to FIG. 4, the pulses gated through the AND gates 25 and 26 are applied respectively to a counter 28 and to a counter 29 whose counts are compared by a comparator circuit 30 providing at its outputs the algebraic sign of the difference between the counts of the counters. The algebraic sign information is applied to the inputs C and D of the circuit 27. The circuit 27 is further provided with inputs H and G which are connected respectively to the clock 23 and to the output $\overline{Q}$ of the monostable multivibrator 20. The machining pulses are obtained between an output B connected to the workpiece 2 and an output A connected to the electrode wire 1 through a pair of sliding contacts 31 and 32.

Control of the alignment of the wire electrode 1 is effected periodically each time a pulse is applied to the input of the multivibrator 22. When a pulse is applied to the input of the multivibrator 22, its output Q enables the AND gate 25, thus applying to the input of the counter 28 the pulses supplied at the ouput E of the circuit 27, each pulse indicating the presence of a short-circuited discharge at the gap. After a predetermined time interval, the multivibrator 22 switches over to its opposite state with the result that the AND gate 25 is inhibited. The counter 28 has thus counted during the time interval the number of short-circuited electrical discharges. The signal appearing at the output $\overline{Q}$ of the multivibrator 22 causes a change in the state of the multivibrator 20 providing a signal at its output Q of the multivibrator 20 which is applied to an input of the comparator 18 for decreasing the reference value of the force of traction exerted upon the electrode wire during a predetermined time interval and, in addition, which enables the AND gate 26 for supplying to the input of the counter 29 the pulses appearing at the output E of the circuit 27 during the same time interval. The counter 29 therefore counts the number of short-circuited discharges occurring during the time interval in the course of which the force of traction exerted on the electrode wire is changed. The comparator circuit 30 provides at its output the algebraic sign representing the difference between the two numbers counted by the counters and applies this information by means of logical signals to the inputs C and D of the circuit 27. One of the machining parameters, for example, the voltage applied across the electrode wire and the workpiece, is changed by one step in the appropriate direction represented by the algebraic sign at the output of the comparator circuit 30 such that a signal appears at the output $\overline{Q}$ of the multivibrator 20, that is at the end of the time interval during which the force of traction exerted on the electrode wire has been changed.

At the end of this succession of events, a pulse is provided at the output F of the circuit 27 for resetting to zero the counters 28 and 29. The cycle is repeated for each pulse appearing at the output of the frequency divider circuit 24.

The measuring of the deviation of the electrode wire and the correction of the deviation can be effected at the beginning of a cut or during a cut at regular time intervals, for example every five minutes or any other appropriate time interval, or prior to cutting in the workpiece a portion of the path presenting a change of direction of small radius.

Figure 5:
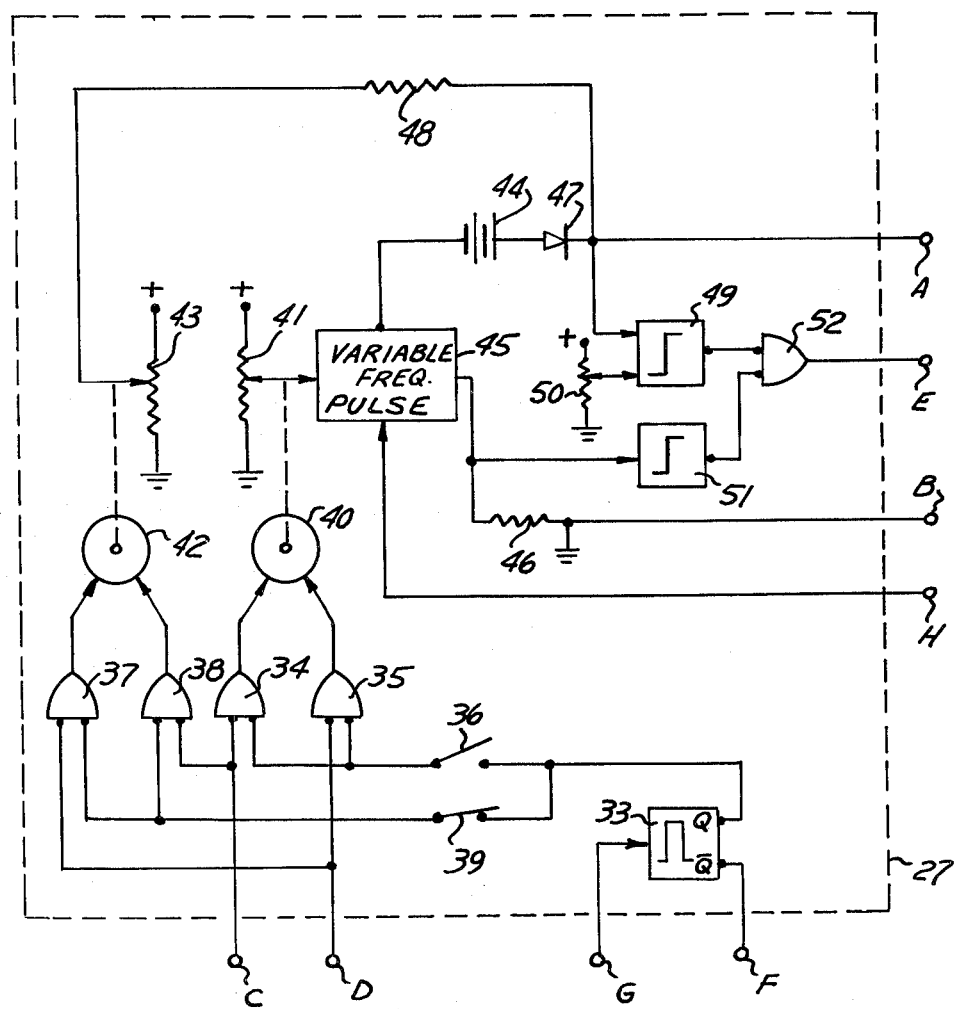
FIG. 5 is a schematic illustration of a portion of the circuit of FIG. 4.

FIG. 5 is a schematic of the circuit 27 of FIG. 4. As shown at FIG. 5, a monostable multivibrator 33 has an input connected to the circuit input G and an output Q connected to one of the inputs of each of a pair of AND gates 34 and 35 through a switch 36, and to one of the inputs of each of another pair of AND gates 37 and 38 through a switch 39. The $\overline{Q}$ output of the monostable multivibrator 33 is connected to the terminal F of the circuit which in turn is connected to the inputs R of the counters 28 and 29, FIG. 4. The terminal C of the circuit 27 is connected to the other inputs of the AND gates 34 and 38, and the terminal D is connected to the other inputs of the AND gates 35 and 37. The signals at the outputs of the gates 34 and 35 control the duration of rotation of a motor 40 driving the slider of a potentiometer 41. The signals at the outputs of the AND gates 37 and 38 control the direction of rotation of a motor 42 coupled to the slider of a potentiometer 43.

The machining pulses, obtained from a DC current source 44, are connected across the terminals A and B of the circuit 27 through a pulse generator 45, a resistor 46 and a diode 47. The terminals A and B of the circuit 27 are connected respectively to the electrode wire 1 and to the workpiece 2, FIG. 4. The pulse generator 45 accepts pulses from the clock 23 of FIG. 4 through the terminal H of the circuit 27 and provides pulses through its output circuit connected across the terminals A and B at a frequency which is variably adjusted as a function of a variable voltage as measured across the potentiometer 41 by the slider of the potentiometer. The slider of the potentiometer 43 is connected to the terminal A through a resistor 48 of very high resistance such as to limit the current flow through that circuit to a value insufficient to maintain electrical discharges.

Detection of short-circuits across the electrode tool-workpiece gap is effected in a conventional manner by means of a Schmitt trigger 49 having an input connected to the terminal A of the circuit 27 and its other input connected to the slider of a potentiometer 50, such that a logical signal is provided at the output of the Schmitt trigger 49 when the machining voltage is lower than the voltage adjustably provided by the potentiometer 50. A second Schmitt trigger 51 detects the voltage drop across the resistor 46, caused by a current pulse flowing through the resistor, and provides a logical signal at its output which is applied to one of the inputs of an AND gate 52 whose other input is connected to the output of the Schmitt trigger 49. In this manner, a pulse is provided at the output of the AND gate 52 connected to the terminal E each time the machining voltage, during an electrical discharge, is lower than a predetermined level.

Each time the variation of the force of traction exerted on the electrode wire 1 comes to an end, the signal at the output $\overline{Q}$ of the multivibrator 20 (FIG. 4), causes a change of state of the multivibrator 33. If the switch 39 is closed, as shown at FIG. 5, the signal at the output Q of the multivibrator 33 is enabled through the AND gate 37 or through the AND gate 38 according to both the algebraic sign detected by the detector circuit 30 of FIG. 4 and the information applied to the input D or C of the circuit 27. The motor 42 displaces the slider of the potentiometer 43 such as to progressively change the high voltage applied between the electrodes during the period of time when the multivibrator 33 is unstable, which in turn permits to modify the electrostatic forces applied on the electrode wire until a balance of the forces is achieved, as illustrated schematically at FIG. 2. If such a modification of the electrostatic forces is not sufficient to achieve an equilibrium, the switch 36 is closed and the motor 40 is controlled simultaneously such as to vary the frequency of the electrical discharges by means of the potentiometer 41 driven by the motor 40.

The effect of the electrostatic forces could also be controlled by action on the electrode wire by varying the moment at which the high voltage is applied across the electrodes after the end of a current pulse. Under such conditions, the voltage across the potentiometer 43 is used for varying the duration of the unstable state of an additional monostable multivibrator whose output signal prevents applying a high voltage across the electrode after the end of each current pulse.

It will be appreciated that the present invention is not limited to a circuit detecting short circuits across the gap, but it is also adaptable to other known systems for detecting machining conditions, for example to systems capable of measuring the machining speed or rate or the useful or average machining current.

Having thus described the present invention by way of an example of practical application thereof, modification whereof will be apparent to those skilled in the art, what is claimed as new is as follows:

1. In a method for cutting by electrical discharges an electrode workpiece by means of an electrode tool in the form of a wire, wherein said wire is displaced relative to said workpiece by being supported by a pair of spaced-apart support and guiding means between which said wire is stretched by a predetermined force of traction applied to said wire, wherein successive voltage pulses are applied across said electrodes for triggering current pulses, and wherein a transverse force is applied to said wire tending to misalign said wire with said support and guiding means, the improvement comprising measuring a signal representing machining efficiency, varying momentarily the predetermined force of traction applied to the wire, measuring the influence exerted by varying said predetermined force of traction upon said signal representing machining efficiency, and adjusting as a function of said last measurement a machining parameter causing said transverse force to be applied on said wire such as to reduce to a minimum value the influence of said variation of force of traction upon said signal representing machining efficiency whereby said machining parameter is adjusted in a direction tending to align said wire with said support and guiding means.

2. The improvement of claim 1 wherein the predetermined force of traction applied on said wire is decreased during a predetermined time interval.

3. The improvement of claim 1 wherein short-circuited discharges during a predetermined time interval are counted as a measure of the influence upon said signal of the variation of the predetermined force of traction applied to said wire.

4. The improvement of claim 1 wherein current pulses are measured during a predetermined time interval as a measure of the influence upon said signal of the variation of the predetermined force of traction applied to said wire.

5. The improvement of claim 1 wherein short-circuited discharges are counted and current pulses are measured during a predetermined time interval as a measure of the influence upon said signal of said variation of the predetermined force of traction applied to said wire.

6. The improvement of claim 3 wherein voltage across the electrodes is the machining parameter which is adjusted.

7. The improvement of claim 3 wherein average machining current is the machining parameter which is adjusted.

8. The improvement of claim 3 wherein voltage across the electrodes and average machining current are the machining parameters which are adjusted.

9. The improvement of claim 4 wherein voltage across the electrodes is the machining parameter which is adjusted.

10. The improvement of claim 4 wherein average machining current is the machining parameter which is adjusted.

11. The improvement of claim 4 wherein voltage across the electrodes and average machining current are the machining parameters which are adjusted.

12. The improvement of claim 5 wherein voltage across the electrodes is the machining parameter which is adjusted.

13. The method of claim 5 wherein average machining current is the machining parameter which is adjusted.

14. The improvement of claim 5 wherein voltage across the electrodes and average machining current are the machining parameters which are adjusted.

15. An apparatus for cutting by electrical discharges an electrode workpiece by means of an electrode tool in the form of a wire, wherein said wire is displaced relative to said workpiece by being supported by a pair of spaced-apart support and guiding means between which said wire is stretched by a predetermined force of traction applied to said wire and wherein successive voltage pulses are applied across said electrodes for triggering machining current pulses, said apparatus comprising means for obtaining a first signal representative of machining efficiency, means for elaborating a second signal representative of said predetermined force of traction, means for adjusting the force of traction exerted on said wire as a function of said second signal, means for varying said second signal during a predetermined time interval, means for effecting a measure of said first signal before and during said time interval, means for comparing the algebraic resultant of said measures, and means for varying the amplitude of said voltage pulses applied across said electrodes in response to the difference between said measures until said difference reaches a minimum value.

16. An apparatus for cutting by electrical discharges an electrode workpiece by means of an electrode tool in the form of a wire, wherein said wire is displaced relative to said workpiece by being supported by a pair of spaced-apart support and guiding means between which said wire is stretched by a predetermined force of traction applied to said wire and wherein successive pulses are applied across said electrodes for triggering machining current pulses, said apparatus comprising means for obtaining a first signal representative of machining efficiency, means for elaborating a second signal representative of said predetermined force of traction, means for adjusting the force of traction exerted on said wire as a function of said second signal, means for varying said second signal during a predetermined time interval, means for effecting a measure of said first signal before and during said time interval, means for comparing the algebraic resultant of said measures, and means for varying the average intensity of said machining current pulses flowing across said electrodes in response to the difference between said measures until said difference reaches a minimum value.

17. An apparatus for cutting by electrical discharges an electrode workpiece by means of an electrode tool in the form of a wire, wherein said wire is displaced relative to said workpiece by being supported by a pair of spaced-apart support and guiding means between which said wire is stretched by a predetermined force of traction applied to said wire and wherein successive voltage pulses are applied across said electrodes for triggering machining current pulses, said apparatus comprising means for obtaining a first signal representative of machining efficiency, means for elaborating a second signal representative of said predetermined force of traction, means for adjusting the force of traction exerted on said wire as a function of said second signal, means for varying said second signal during a predetermined time interval, means for effecting a measure of said first signal before and during said time interval, means for comparing the algebraic resultant of said measures, and means for varying the amplitude of said voltage pulses applied across said electrodes and the average intensity of said machining current pulses in response to the difference between said measures until said difference reaches a minimum value.

18. An apparatus for cutting by electrical discharges an electrode workpiece by means of an electrode tool in the form of a wire, wherein said wire is displaced relative to said workpiece by being supported by a pair of spaced-apart support and guiding means between which said wire is stretched by a predetermined force of traction applied to said wire, wherein successive voltage pulses are applied across said electrodes for triggering machining current pulses, and wherein a transverse force is applied to said wire tending to misalign said wire with said support and guiding means, said apparatus comprising means for measuring a signal representing machining efficiency, means for varying momentarily the predetermined force of traction applied to the wire, means for measuring the influence exerted by varying said predetermined force of traction upon said signal representing machining efficiency, and means for adjusting as a function of said last measurement a machining parameter causing said transverse force to be applied on said wire such as to reduce to a minimum value the influence of said variation of force of traction upon said signal representing machining efficiency, whereby said machining parameter is adjusted in a direction tending to align said wire with said support and guiding means.

19. The apparatus of claim 18 wherein said means for varying momentarily the predetermined force of traction applied to the wire decreases said force of traction during a predetermined time interval.

20. The apparatus of claim 18 wherein said means for measuring the influence of said variation of the predetermined force of traction comprises means for counting short-circuited discharges during a predetermined time interval.

21. The apparatus of claim 18 wherein said means for measuring the influence of said variation of the predetermined force of traction comprises means for measuring current pulses during a predetermined time interval.

22. The apparatus of claim 18 wherein said means for measuring the influence of said variation of the predetermined force of traction comprises means for counting short-circuited discharges and means for measuring current pulses during a predetermined time interval.

23. The apparatus of claim 20 wherein said means for adjusting said machining parameter comprises means for adjusting the amplitude of said voltage pulses.

24. The apparatus of claim 20 wherein said means for adjusting said machining parameter comprises means for adjusting the intensity of said current pulses.

25. The apparatus of claim 20 wherein said means for adjusting said machining parameter comprises means for adjusting the amplitude of said voltage pulses and means for adjusting the intensity of said current pulses.

26. The apparatus of claim 21 wherein said means for adjusting said machining parameter comprises means for adjusting the amplitude of said voltage pulses.

27. The apparatus of claim 21 wherein said means for adjusting said machining parameter comprises means for adjusting the average intensity of said current pulses.

28. The apparatus of claim 21 wherein said means for adjusting said machining parameter comprises means for adjusting the amplitude of said voltage pulses and the average intensity of said current pulses.

29. The apparatus of claim 22 wherein said means for adjusting said machining parameter comprises means for adjusting the amplitude of said voltage pulses.

30. The apparatus of claim 22 wherein said means for adjusting said machining parameter comprises means for adjusting the average intensity of said current pulses.

31. The apparatus of claim 22 wherein said means for adjusting said machining parameter comprises means for adjusting the amplitude of said voltage pulses and means for adjusting the average intensity of said current pulses.

* * * * *